US012504949B2

(12) United States Patent
Otto et al.

(10) Patent No.: US 12,504,949 B2
(45) Date of Patent: Dec. 23, 2025

(54) MITIGATING LATENCY IN SPOKEN INPUT GUIDED SELECTION OF ITEM(S)

(71) Applicant: GOOGLE LLC, Mountain View, CA (US)

(72) Inventors: Adrian Otto, Mountain View, CA (US); William Byrne, Davis, CA (US); Ashwin Ram, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 38 days.

(21) Appl. No.: 18/080,512

(22) Filed: Dec. 13, 2022

(65) Prior Publication Data

US 2024/0126501 A1 Apr. 18, 2024

Related U.S. Application Data

(60) Provisional application No. 63/416,557, filed on Oct. 16, 2022.

(51) Int. Cl.
*G06F 3/16* (2006.01)
*G06F 3/0482* (2013.01)
(Continued)

(52) U.S. Cl.
CPC ............ *G06F 3/167* (2013.01); *G06F 3/0482* (2013.01); *G06F 40/205* (2020.01); *G10L 15/26* (2013.01)

(58) Field of Classification Search
CPC ...... G06F 3/167; G06F 40/205; G06F 3/0482; G10L 15/26
See application file for complete search history.

(56) References Cited

U.S. PATENT DOCUMENTS 8,196,061 B1\* 6/2012 Bhojan ................. G06F 3/0483
715/787
9,576,574 B2 2/2017 Van Os
(Continued)

FOREIGN PATENT DOCUMENTS

WO 2016191737 A2 12/2016

OTHER PUBLICATIONS

Okur, E. et al., "Natural Language Interactions in Autonomous Vehicles: Intent Detection and Slot Filling from Passenger Utterances"; arXiv.org, Cornell University; arXiv:1904.10500v1; 17 pages; dated Apr. 23, 2019.
(Continued)

*Primary Examiner* — Irete F Ehichioya
*Assistant Examiner* — Samuel Shen
(74) *Attorney, Agent, or Firm* — Gray Ice Higdon

(57) ABSTRACT

Mitigating latency in guiding a user, during an interaction between the user and a computing system, in selecting a subset of item(s), from a superset of candidate items, and causing performance of further action(s) based on the selected subset of item(s). In guiding a user in selecting the subset of items, various implementations enable the user to provide only spoken input(s) in selecting the subset of item(s), and provide visual output(s) that are responsive to the spoken input(s) and that guide the user in selecting the item(s). In some of those various implementations, there is not any (or there is only de minimis) audible spoken synthesized spoken output rendered by the computing system in guiding the user in selecting the subset of item(s).

19 Claims, 8 Drawing Sheets

(51) Int. Cl.
*G06F 40/205* (2020.01)
*G10L 15/26* (2006.01)

(56) References Cited

U.S. PATENT DOCUMENTS

| | | | |
|---|---|---|---|
| 10,777,186 B1* | 9/2020 | Stefani | G10L 15/183 |
| 10,978,090 B2 | 4/2021 | Binder et al. | |
| 2007/0271156 A1* | 11/2007 | Sarusi | G06Q 30/0633 |
| | | | 705/14.27 |
| 2014/0380285 A1* | 12/2014 | Gabel | G06N 5/022 |
| | | | 717/139 |
| 2015/0269204 A1* | 9/2015 | Osborne | G06F 16/951 |
| | | | 707/711 |
| 2020/0034848 A1* | 1/2020 | Seo | G07F 17/40 |
| 2020/0286193 A1* | 9/2020 | Beecher | G06Q 30/0633 |
| 2021/0280180 A1* | 9/2021 | Skobeltsyn | G06F 16/90332 |
| 2023/0352009 A1* | 11/2023 | Behre | G06F 40/279 |

OTHER PUBLICATIONS

Schmitt, A. et al., "Advances in the Witchcraft Workbench Project"; Discourse and Dialogue, Association for Computational Linguistics; pp. 261-264; dated Sep. 24, 2010.
European Patent Office; International Search Report and Written Opinion issued in Application No. PCT/US2023/034926; 14 pages; dated Jan. 22, 2024.

* cited by examiner

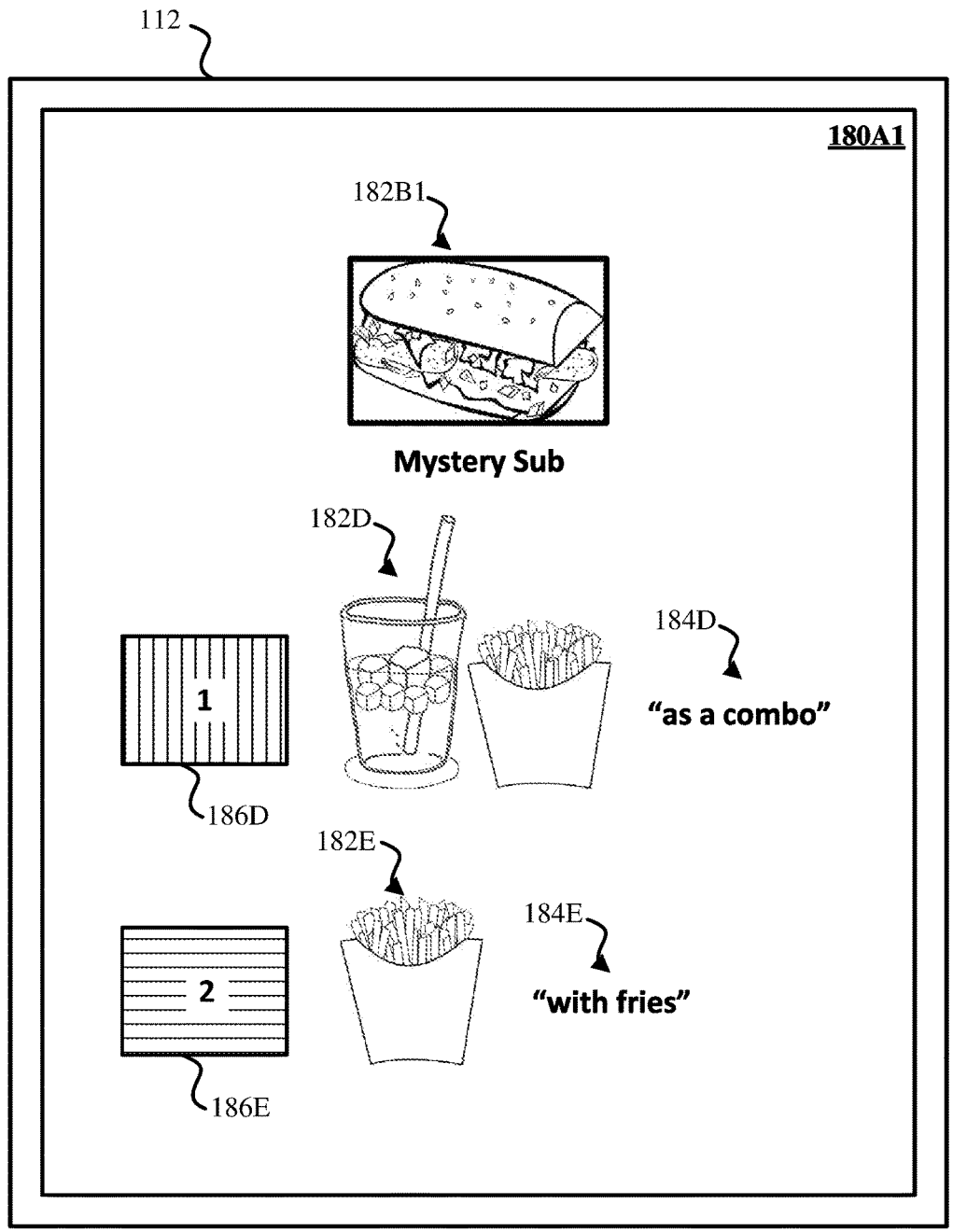
FIG. 3A1

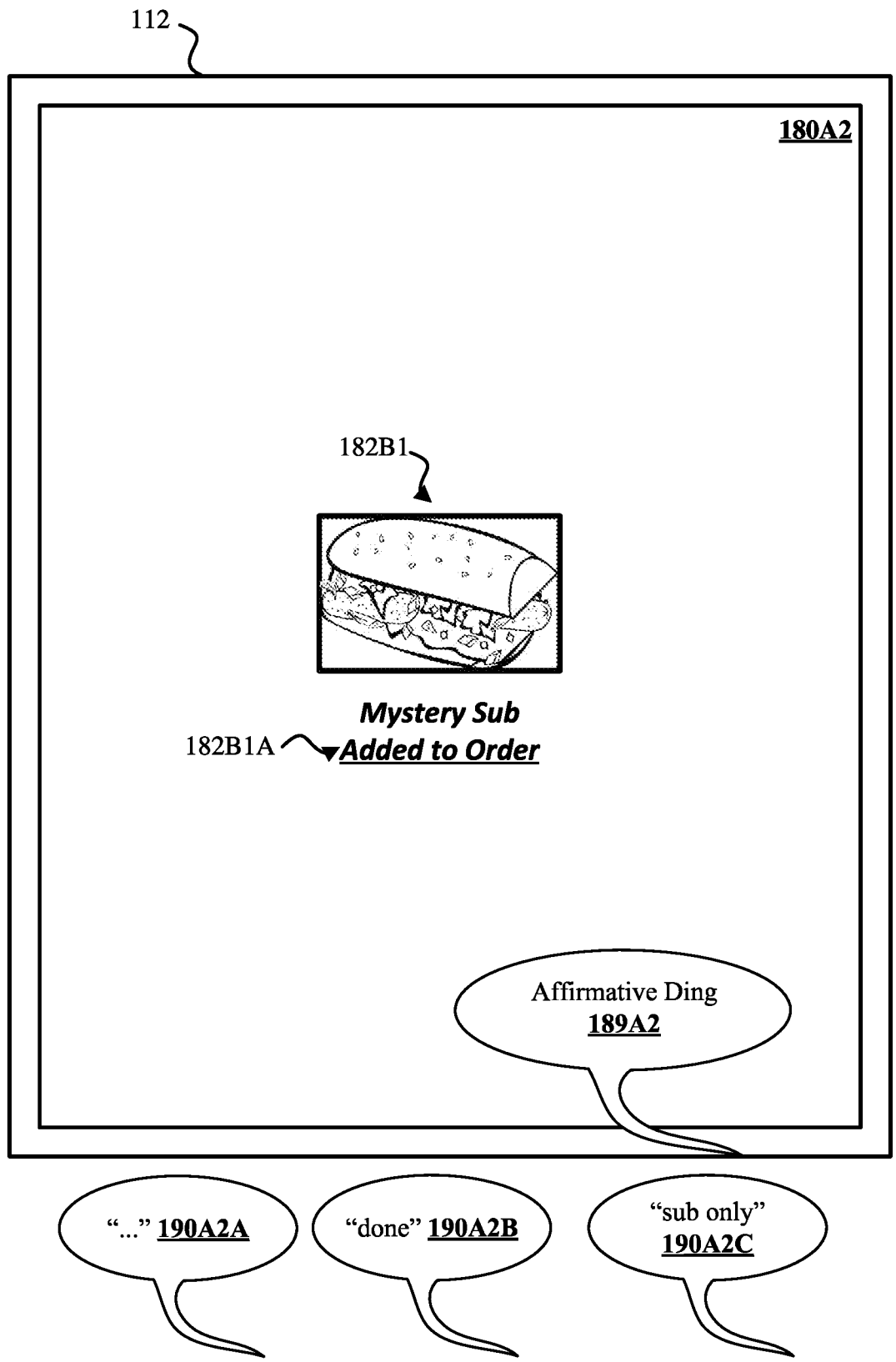
FIG. 3A2

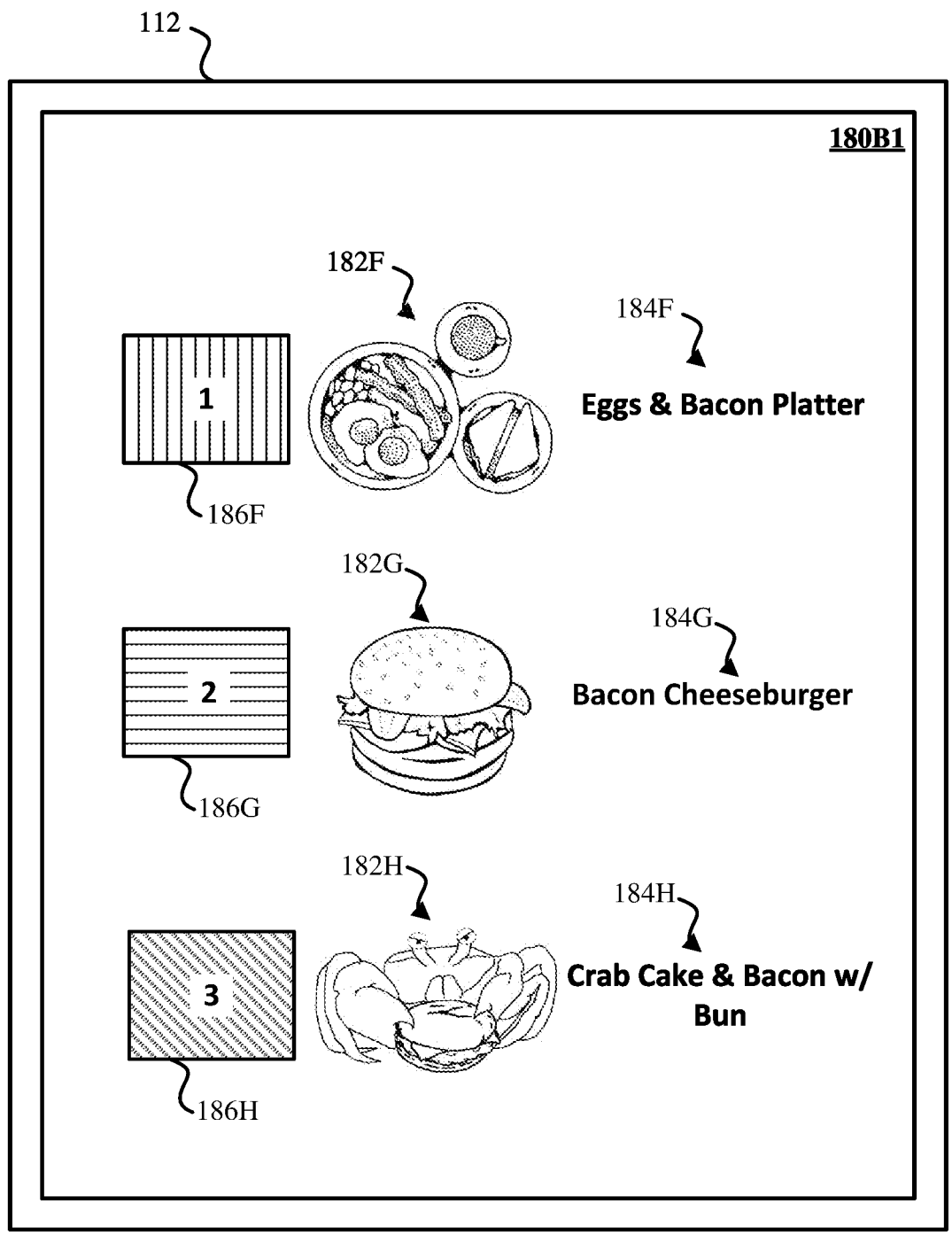
FIG. 3B1

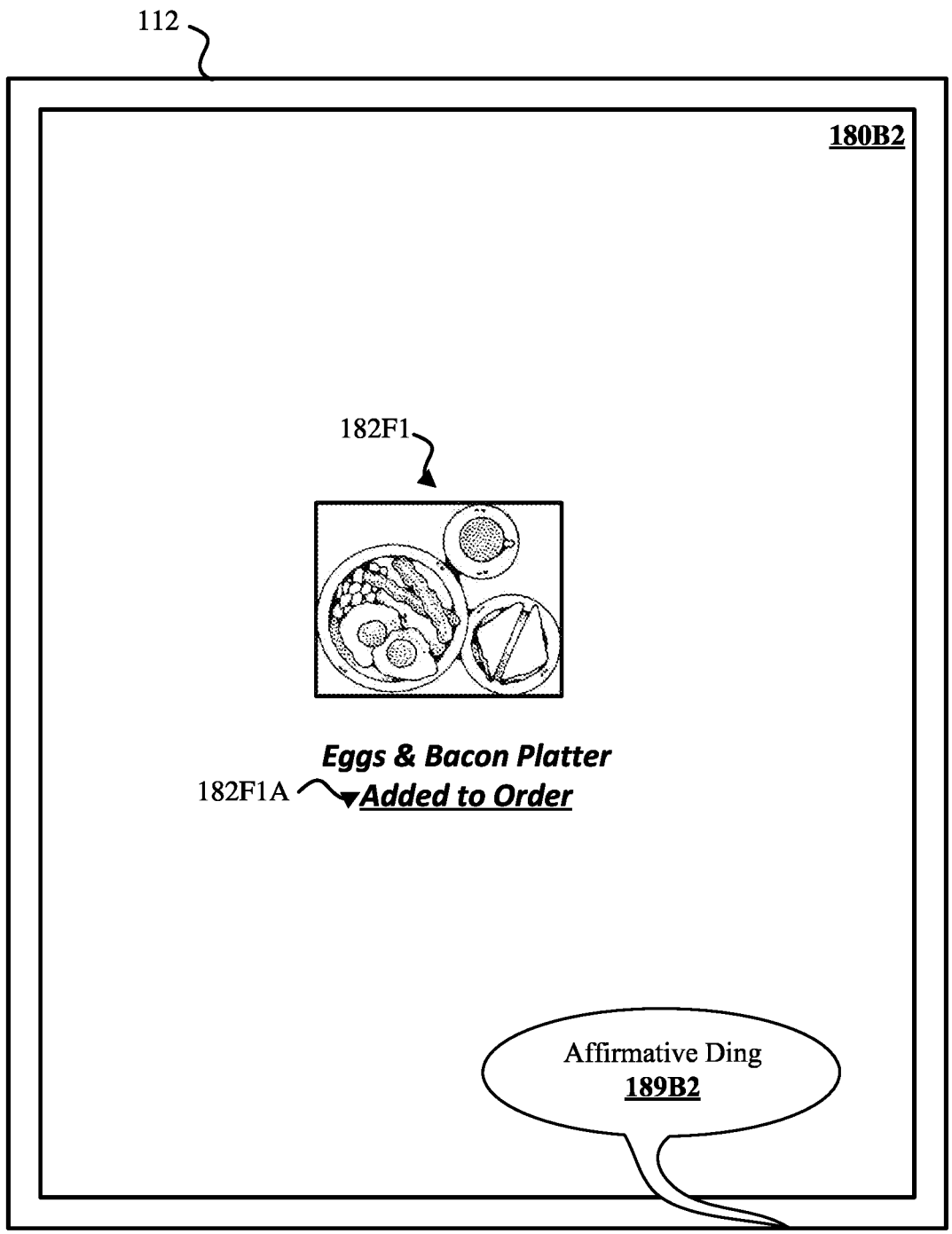
FIG. 3B2

MITIGATING LATENCY IN SPOKEN INPUT GUIDED SELECTION OF ITEM(S)

BACKGROUND

Various computer-based approaches have been proposed for guiding a user in selecting a subset of item(s) from a superset of candidate items. For example, computer-based approaches have been proposed for guiding a user in selecting a subset of particular vehicle features, for a vehicle, from a superset of candidate vehicle features for the vehicle. As another example, computer-based approaches have been proposed for guiding a user in selecting a subset of tickets, for an event at a venue, from a superset of available tickets for the event.

As one particular example, approaches have been proposed to at least partially automate food ordering at quick service restaurants (QSRs). For instance, some QSRs implement ordering kiosks, with touchscreens, that enable a user to provide touch-based inputs in navigating a hierarchy of menu items and selecting a subset of those menu items to incorporate in an order. However, utilizing touchscreens and/or hierarchical navigation can be high-latency due to, for example, a user needing to thoroughly review presented options at each screen before making a selection and/or inadvertently navigating through incorrect branch(es) of the hierarchy (e.g., and needing to navigate backwards through the hierarchy). This can cause prolonged usage of resources of the computing device(s) implementing an ordering kiosk and/or can lead to constrained throughput for a fixed set of ordering kiosks. Further, utilization of touchscreens may not be practical or possible for users with limited dexterity and/or in various situations (e.g., when a user is in a car in a drive-thru).

Also, for instance, utilization of turn-based audible dialogs has been proposed in which a user provides spoken utterances, and a computer system provides audible synthesized spoken responses in attempting to formulate an order. However, such techniques can be high-latency due to the time required to render the audible synthesized spoken response. For example, if a spoken utterance of a user in a turn is ambiguous and partially matches five different menu items, an audible synthesized spoken response will be rendered, that describes the five different items, to enable the user to be able to disambiguate the ambiguous initial input with a further spoken utterance. Rendering such an audible spoken response requires time and utilization of resources of computing device(s), and a user may need to await completion of rendering of the audible spoken response before providing a disambiguating further spoken utterance.

SUMMARY

Implementations described herein are directed to mitigating latency in guiding a user, during an interaction between the user and a computing system, in selecting a subset of item(s), from a superset of candidate items, and causing performance of further action(s) based on the selected subset of item(s). The further action(s) that are performed based on the subset of item(s) that are selected can include, for example, transmitting the selected subset of item(s), via an application programming interface (API), to cause the selected subset to be added to a list (e.g., to an order) and/or to cause other fulfillment action(s) to be performed based on the selected subset of item(s). Accordingly, implementations present various techniques that guide a user during interaction between the user and a computer system in accomplishing a technical task (e.g., transmitting a selected subset via an API or other backend), and that enable the technical task to be accomplished with low latency.

In guiding a user in selecting the subset of items, various implementations enable the user to provide only spoken input(s) in selecting the subset of item(s), and provide visual output(s) that are responsive to the spoken input(s) and that guide the user in selecting the item(s). In some of those various implementations, there is not any (or there is only de minimis) audible synthesized spoken output rendered by the computing system in guiding the user in selecting the subset of item(s). Rather, guiding of the user is achieved via visual output(s) such as image(s) of item(s) (e.g., at least those of the subset) and, optionally, visual natural language description(s) of the item(s), annotation rendering descriptor(s) for the item(s), and/or non-natural language earcon(s) (e.g., a brief first affirmative "ding" to signify a selection and/or a brief second non-affirmative ding to signify a cancellation of a selection). In some of those various implementations, non-spoken and non-touch selection of item(s) for inclusion in the subset of item(s) can additionally or alternatively be utilized. For example, image(s) from camera(s) can be processed to detect an area of a display at which a user is pointing and/or to which a user's gaze is directed, and an item in that area can be selected for inclusion in the subset responsive to the user pointing and/or directing their gaze toward that area.

Through omission of any (or only inclusion of de minimis) audible synthesized spoken output in guiding the user, latency in formulating a selection of the subset can be mitigated. This can be a result of, for example, visual output(s) corresponding to item(s) being renderable more quickly relative to rendering of synthesized spoken output, and being renderable simultaneously on a display (whereas synthesized spoken output must be rendered sequentially over time). This can additionally or alternatively be a result of visual output(s) being more quickly comprehended by humans than is a synthesized spoken counterpart. Further, latency can be mitigated through enabling selection of the subset through spoken input(s) (e.g., via a user providing spoken input(s) exclusively, which can be provided more quickly by humans than can a sequence of touch input(s) directed to a complex hierarchical navigation interface). Yet further, enabling selection of the subset through spoken input(s) enables users with constrained dexterity to perform selections and/or enables selection performance in situations where touch and/or other type(s) of input(s) to a corresponding computing device are not possible or practical. Even further, implementations that additionally or alternatively enable non-spoken and non-touch selection of item(s) of the subset enables users with speaking impairments to perform selections and/or enables selection performance in situations where spoken input(s) are not possible or practical (e.g., a situation where there is a high-level of noise in the environment).

Implementations disclosed herein can include, or interface with, a visual display via which visual output(s) are rendered. The visual display can include, for example, a television, a monitor or other visual display. The visual display can be controlled by a computing device, incorporated as part of the visual display or in communication with the visual display. For example, the computing device can include a browser or other application that interfaces with a graphical user interface (GUI) system, and the GUI system can dictate what the application causes to be rendered at the display. Implementations can further include, or interface with, microphone(s) that can at least selectively detect audio data, and a stream of audio data that is detected via the microphones can be at least selectively provided to streaming automatic speech recognition (ASR) component(s). The microphones can be incorporated as part of the display or can be separate from, but proximal to, the display. In various implementations, the stream of audio data is provided to the streaming ASR component(s) in response to detecting likely or actual presence of spoken input, such as detecting voice activity (e.g., via a voice activity detection model), detecting a vehicle within a threshold proximity of the microphone(s) and/or a corresponding display, and/or detecting a human within a threshold proximity of the microphones and/or a corresponding display.

The GUI system communicates with the streaming ASR component(s) and can receive a streaming transcription as it is generated by the streaming ASR component(s). The ASR component(s) can generate the streaming transcription through processing of an audio data stream that is detected via the microphone(s) and that captures a spoken utterance of a user.

The GUI system can include a semantic parser that processes the streaming transcription, as it is received, to generate one or more instances (each based on a thus far received portion of the streaming transcription) of structured representation(s) that match the streaming transcription and a confidence metric for each of the structured representation(s). The semantic parser can optionally interface with a large language model (LLM) in generating structured representation(s) and/or corresponding confidence metric(s). For example, a thus far received portion of the streaming transcription can be processed, using the LLM, to generate a representation output that indicates a semantic representation of the thus far received portion of the streaming transcription. The representation output can then be processed by the semantic parser to determine which of multiple candidate structured representation(s), that each correspond to item(s) of a superset, match the representation output and to generate a corresponding confidence metric for each. Each of the candidate structured representations can be, for example, in a JavaScript Object Notation (JSON) format (or other structured format) and can indicate, for example, a semantic identifier for a corresponding item and attribute(s) for the item. Attribute(s) for an item, that can be indicated by a corresponding structured representation, can include a quantity for the item (e.g., one of the item, two of the item, etc.), modification option(s) for the item (e.g., for a cheeseburger item modification options can include add and/or remove: mustard, ketchup, pickles, and/or onions), and/or related option(s) for the item (e.g., for a cheeseburger item related options can include "make it a combo", "add fries", and/or "add a drink").

When a structured representation, generated by the semantic parser, has an associated confidence metric that satisfies a threshold (e.g., an absolute threshold and/or a threshold relative to confidence metric(s) for other structured representation(s)), the corresponding item can be selected exclusively. In response, visual output, for the corresponding item, can be caused to be rendered in a GUI via the display. The visual output can include, for example a pre-stored image for the corresponding item, a visual natural language descriptor for the corresponding item, a price for the corresponding item, and/or other visual output. The visual output for the corresponding item can be the only visual output rendered in the GUI via the display and/or can be rendered with an indication (e.g., a border around some/ all of the visual output for the corresponding item) to indicate it is primed for inclusion in a list. If a passive confirmation (e.g., passage of a threshold amount of time) or active confirmation (e.g., speaking of "add it", "confirm", etc.) occurs during rendering of visual output for the corresponding item, it can be added to a list (e.g., via interaction with a fulfillment API). Optionally, during rendering of the visual output for the corresponding item, the streaming transcription can continue to be monitored, by the semantic parser and/or a display-dependent parser (described herein), for further spoken input that e.g., modifies the item according to modification option(s), adds other item(s) according to the related option(s) for the item, and/or that cancels inclusion of the corresponding item to the list.

When structured representation(s), generated by the semantic parser, have associated confidence metrics that fail to satisfy a threshold (e.g., an absolute threshold and/or a threshold relative to confidence metric(s) for other structured representation(s)), multiple of the structured representations can be selected, such as the N with the highest confidence metrics and/or those with confidence metrics satisfying a secondary threshold. In response, corresponding visual output, for each of the items corresponding to the selected structured representations, can be caused to be rendered in the GUI via the display. Optionally, a position of visual output for an item, within the GUI, can be determined based on the confidence metric for its structured representation (as determined by the semantic parser) and/or based on other metric(s) for the item. Such other metric(s) for the item can include measure(s) of popularity for the item, such as a popularity measure that indicates frequency of inclusion of the item, in a list by a population of users, over a temporal period (e.g., over the last day, the last week, etc.).

In various implementations, when corresponding visual output is rendered for each of multiple items, at least one corresponding annotation descriptor can be rendered in the GUI in conjunction with the visual output for each of the multiple items. The annotation descriptor for an item can be one that is not semantically descriptive of the item. For example, assume corresponding visual output is provided for two items: a bacon cheeseburger and a cheeseburger. Annotation descriptor(s) for the bacon cheeseburger can include a number (e.g., "1"), a letter (e.g., "A"), and/or a color (e.g., "yellow") rendered along with the bacon cheeseburger visual output (e.g., atop, beside, or around an image of the bacon cheeseburger). Annotation descriptor(s) for the cheeseburger are selected to be distinct from those for the bacon cheeseburger and can include a number (e.g., "2"), a letter (e.g., "B"), and/or a color (e.g., "red") rendered along with the cheeseburger visual output.

When visual output for multiple items is being rendered simultaneously within a GUI, association(s) between each of the items and their rendering descriptor(s) can be defined. The rendering descriptor(s) for visual output for an item can include positional descriptor(s) and/or annotation descriptor(s). A positional descriptor for visual output for an item can describe a relative position of the visual output in the GUI, that is relative to the visual output(s) for other item(s). For example, if visual output for an item is presented above visual output(s) for all other item(s), positional descriptor(s) for the item can include "top", "first", and/or "upper". An annotation descriptor for visual output for an item can describe an annotation rendered in the GUI in conjunction with the visual output for the item. For example, if an image of the item is rendered adjacent to an "A" and the image is bordered in "yellow", the annotation descriptor(s) for the item can include "A" and "yellow".

In various implementations, the GUI system also includes a display-dependent parser that at least selectively processes the streaming transcription in parallel with the semantic parser. For example, the display-dependent parser can process the streaming transcription in parallel with the semantic parser at least when visual outputs for multiple items are being rendered in the GUI via the display. The display-dependent parser can leverage current rendering descriptor(s) in determining whether a current portion of the streaming transcription matches one of the rendering descriptor(s). If so, the display-dependent parser can cause selection of the item that is stored in association with the matching rendering descriptor. For example, assume an image of an item is currently being rendered above image(s) of all other item(s) being displayed, the image is adjacent to an "A" and the image is bordered in "yellow". The display-dependent parser can cause selection of the item responsive to a portion, of the streaming transcription, that temporally corresponds to such rendering, including any one of "A", "yellow", "top", and/or "first". When image-based input(s) are also enabled, such as a pointing and/or gaze-based input(s), the display-dependent parser can cause selection of the item additionally or alternatively responsive to those input(s) correlating to positional descriptor(s) for the item. For example, an item having a positional descriptor of "top" can be selected responsive to detecting a user pointing and/or directing their gaze at a "top" area of the display.

As noted above, the semantic parser can process the streaming transcription in parallel with the display-dependent parser, and can cause selection of a corresponding item in response to generating a corresponding structured representation with a threshold confidence measure. Accordingly, in situations where a user provides spoken word(s) that are semantically descriptive of a corresponding item the semantic parser can cause selection of the corresponding item—whereas such spoken word(s) would not cause the display-dependent parser to cause selection of the corresponding item (since such spoken word(s) will not match rendering descriptor(s)). Conversely, in situations where a user provides spoken word(s) that reference a position of an item in the GUI and/or an annotation rendered in conjunction with visual output for the item in the GUI, the display-dependent parser can cause selection of the corresponding item—whereas such spoken word(s) would not cause the semantic parser to cause selection of the corresponding item (since such spoken word(s) will not be semantically descriptive of the actual corresponding item). Put another way, the semantic parser and the display-dependent parser, when processing a streaming transcription in parallel, can complement each other as the semantic parser is able to cause selection of an item in response to word(s) that are semantically descriptive of the item and the display-dependent parser is able to cause selection of an item in response to word(s) that match rendering descriptor(s) associated with current display of visual output(s) of the item in the GUI.

In these and other manners, selection of an item can be enabled for a more robust range of words included in spoken input through parallel operation of the semantic parser and the display-dependent parser. This provides a corresponding user with the flexibility to provide spoken output that is truly semantically representative of a desired item or, alternatively, to provide spoken output that is only semantically representative of how that item is currently being displayed in the GUI. Accordingly, this can enable the user to speak what resonates best with the user, enabling quicker speaking and quicker selection of a corresponding item. Further, speaking term(s) that correspond to rendering descriptor(s) for an item (e.g., "A" or "top") can often be quicker than speaking term(s) that are truly semantically representative of the item (e.g., "the one with bacon").

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks (e.g., in "the cloud" by a cluster of remote server(s)), and/or both.

BRIEF DESCRIPTION OF THE DRAWINGS

FIG. 3A1 illustrates the display rendering an example next state of the GUI, following the initial state of FIG. 3, and illustrates example spoken utterances of a user that can cause the example next state to be rendered.

FIG. 3A2 illustrates the display rendering an example further next state of the GUI, following the next state of FIG. 3A1, and illustrates example spoken utterances of a user that can cause the example further next state to be rendered.

FIG. 3B1 illustrates the display rendering an example alternate next state of the GUI, following the initial state of FIG. 3, and illustrates example spoken utterances of a user that can cause the example alternate next state to be rendered.

FIG. 3B2 illustrates the display rendering an example further next alternate next state of the GUI, following the alternate next state of FIG. 3B1, and illustrates example spoken utterances of a user that can cause the example further alternate next state to be rendered.

DETAILED DESCRIPTION

Figure 1:
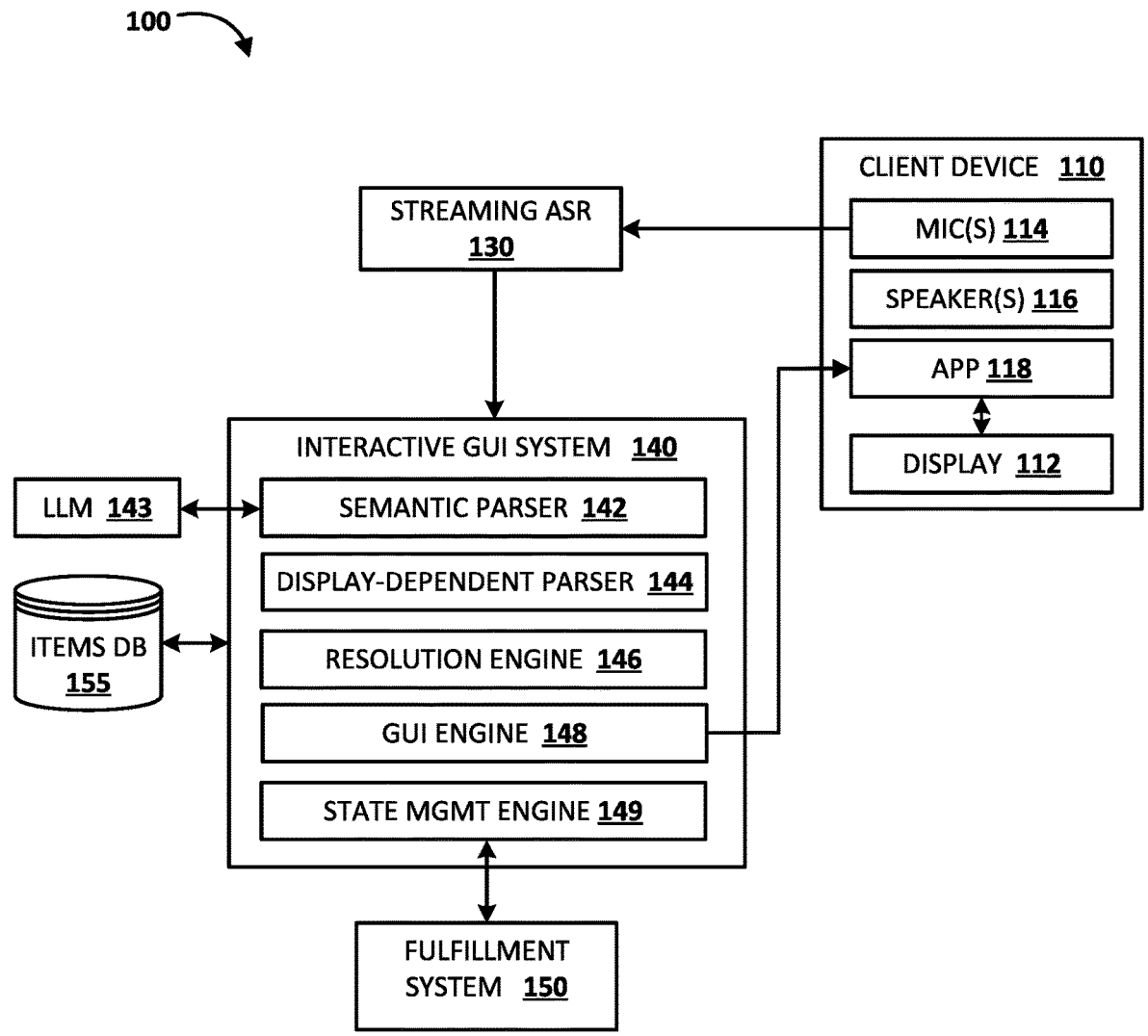
FIG. 1 illustrates a block diagram of an example environment in which implementations disclosed herein can be implemented.

Turning initially to FIG. 1, a block diagram of an example environment 100 that demonstrates various aspects of the present disclosure, and in which implementations disclosed herein can be implemented is depicted.

The example environment 100 includes a client device 110, a streaming ASR engine 130, an interactive GUI system 140, and a fulfillment system 150. Components of the example environment can be communicatively coupled with each other via one or more networks, such as one or more wired or wireless local area networks ("LANs," including Wi-Fi LANs, mesh networks, Bluetooth, near-field communication, etc.) or wide area networks ("WANs", including the Internet). In some implementations, the streaming ASR engine 130 and/or component(s) of the interactive GUI system are implemented in "the cloud" via cluster(s) of high performance sever(s).

The client device 110 is illustrated as including microphone(s) 114, speaker(s) 116, an application 118, and a display 112. For simplicity in FIG. 1, the microphone(s) 114, speaker(s) 116, application 118, and display 112 are all depicted within a rectangle representing the client device 110. However, it should be understood that in various implementations component(s) of the client device 110 will not be housed as part of a single structure and, rather, can be positionally distributed throughout an environment. It should also be understood that in various implementations, additional component(s), which are not illustrated in FIG. 1 for simplicity, can be housed as part of the single structure and/or positionally distributed in the environment. A non-limiting example of such additional component(s) are presence sensor(s) that are described in more detail herein and that can be used to differentiate between subsequent users.

As one example, the client device 110 can include a structure (e.g., a thin client device) that contains e.g., a processor, memory, network interface component(s), and/or other hardware component(s) (not depicted in FIG. 1)— and the app 118 can be executed by the processor utilizing the memory. The app 118 can be utilized to generate the GUI described herein and the display 112 can render the GUI generated by the app 118. However, the display 112 can be located remotely from, but in communication with, the structure that contains the processor, the memory, etc. For example, the communication between the structure and the display 112 can be wireless communication or wired communication (e.g., via High-Definition Multimedia Interface (HDMI) connection). Likewise, the microphone(s) 114 and/or the speaker(s) 116 can optionally be located remote from, but in communication with, the structure that contains the processor, the memory, etc. As a particular example, the display 112, the microphone(s) 114, and the speaker(s) can be located in an exterior environment adjacent to a drive-thru lane of a QSR, and the structure can be located in an interior of the QSR.

A stream of audio data, detected via the microphone(s) 114, can be at least selectively provided to the streaming ASR engine 130. For example, the stream of audio data can be provided to the streaming ASR engine 130 in response to detecting likely or actual presence of spoken input. For example, the client device 110 can detect likely or actual voice input based on detecting voice activity using a voice activity detection model, based on detecting a vehicle within a threshold proximity of the microphone(s) 114 and/or the display 112, and/or based on detecting a human within a threshold proximity of the microphone(s) 114 and/or the display 112. Detecting a vehicle and/or detecting a human can be based on input from presence sensor(s) (not depicted in FIG. 1) coupled with the client device, such as a passive infrared (PIR) sensor, a weight sensor (e.g., detect weight indicative of a vehicle), an underground magnetic loop sensor, a laser beam sensor (e.g., detect presence or passing of a vehicle), and/or other sensor(s).

The ASR engine 130 can process, using streaming ASR model(s), a stream of audio data that captures a spoken utterance and that is generated by microphone(s) 114, to generate a streaming transcription of the spoken utterance. The ASR model(s) can include, for example, e.g., a recurrent neural network (RNN) model, a transformer model, and/or any other type of machine learning model(s). A streaming transcription, of a spoken utterance, is provided by the ASR engine 130 to the interactive GUI system 140, as it is generated (e.g., on a portion-by-portion basis).

The interactive GUI system 140 is illustrated as including a semantic parser 142, a display-dependent parser 144, a resolution engine 146, a GUI engine 148, and a state management engine 149.

The semantic parser 142 processes the streaming transcription, as it is received, to generate one or more instances (each based on a thus far received portion of the streaming transcription) of structured representation(s) that match the streaming transcription and a confidence metric for each of the structured representation(s). In some implementations, the semantic parser 142 can interface with a large language model (LLM) 143 in generating structured representation(s) and/or corresponding confidence metric(s). In some implementations, the semantic parser 142 can additionally or alternatively interface with alternative machine learning model(s) (e.g., neural network model(s)) and/or can utilize text matching heuristic(s) in generating structured representation(s) and/or corresponding confidence metric(s). For example, alternative machine learning model(s) and/or text matching heuristics(s) can optionally be utilized when there is a relatively small superset of items and/or semantically meaningful descriptors thereof are relatively constrained.

As one example, prior to implementation of the interactive GUI system 140 for an entity (e.g., an entity associated with a QSR), the entity can provide (e.g., via an API), for each item of a superset of items for the entity: (a) a structured representation for the item (e.g., one that conforms to a syntax of the fulfillment system 150, which can be managed by the entity), (b) an image of the item, and (c) natural language descriptor(s) of the item (e.g., a menu name of the item). The provided information by the entity can be stored in items database 155. Further, the semantic parser 142 can generate a corresponding semantic representation for each of the item(s) and store it (e.g., in items database 155) in association with (a) the structured representation. For example, the semantic parser 142 can process the (c) natural language descriptor(s), using the LLM 143, to generate an LLM representation output (e.g., an embedding that is a vector of value(s) of an output layer of the LLM 143), and use the generated LLM representation output as the semantic representation for the item.

Thereafter, the semantic parser 142 can receive a portion of a streaming transcription and process that portion (and optionally preceding portion(s)) using the LLM to generate an LLM representation output for the portion. The semantic parser 142 can then compare that LLM representation output to the semantic representation for each of the items. For example, the semantic parser 142 can generate cosine distance measures that are each a corresponding cosine distance between that LLM representation and the semantic representation of a corresponding item. The cosine distance measure, for an item, can indicate whether that item matches the thus far received streaming transcription and, further, can indicate a confidence measure for the match (i.e., closer distance measures indicate greater confidence than do more distant distance measures). The semantic parser 142 can select some (or none) of the items with the closest distance measure(s) and output the stored structured representation(s) for those item(s), optionally along with a corresponding confidence measure for each (e.g., confidence measure(s) based on the distance measure(s)). For example, if a given distance measure satisfies a threshold (e.g., absolute and/or relative to other distance measure(s)), the semantic parser 142 can select the corresponding item and output only its structured representation. As another example, if all of the distance measures fail to satisfy a threshold (e.g., an absolute threshold and/or a threshold relative to other distance measure(s)), the semantic parser 142 can select multiple of the items, such as the N with the closet distance measures and/or those with distance measures satisfying a secondary threshold. The semantic parser 142 can then output the structured representations for each of the selected items and, optionally, a corresponding confidence measure for each (e.g., that conform to or are based on corresponding distance measures).

The display-dependent parser 144 at least selectively processes the streaming transcription in parallel with the semantic parser 142. For example, the display-dependent parser can process the streaming transcription in parallel with the semantic parser at least when the GUI engine 148 is causing visual outputs for multiple items to be rendered in the GUI via the display 112. The display-dependent parser 142 can leverage current rendering descriptor(s), provided by the GUI engine 148, in determining whether a current portion of the streaming transcription matches one of the rendering descriptor(s). If so, the display-dependent parser 142 can cause selection of the item that is stored in association with the matching rendering descriptor.

The resolution engine 146 can work in concert with the semantic parser 142, the display-dependent parser 144, and/or the GUI engine 146. The resolution engine 146 can determine, for an item selected by parser 142 or 144 and while visual output corresponding to the item is being rendered, whether the item should be added to a list, whether any modification(s) to the item are to be made (before adding to a list), and/or whether any related option(s) for the item are to also be selected and added to the list. In determining, for a selected item being rendered, whether to add the item to a list, the resolution engine 146 can determine to add the item to the list responsive to a passive confirmation. A passive confirmation can include, for example, a passage of a threshold duration of time after rendering the selected item, optionally while rendering visual descriptor(s) of the selected item along with an indication that selection is imminent (e.g., rendering a border around the item). The resolution engine 146 can additionally or alternatively determine to add the item to the list responsive to an active confirmation, such as the user speaking "add it", "confirm", "done", etc. When the user speaks a confirmatory portion of an utterance, a corresponding portion of the transcription can be provided to the semantic parser 142, and the semantic parser 142 can determine a confirmatory intent, provide that confirmatory intent to resolution engine 146, and resolution engine 146 can determine the active confirmation responsive to receiving the confirmatory intent.

In determining, for a selected item being rendered, whether any modification(s) to the item are to be made and/or whether any related option(s) should also be selected and added to the list, the resolution engine 146 can reference the structured representation for the item, which can define possible modification(s) and/or related option(s). Further, the semantic parser 142 and/or the display-dependent parser 144 can be utilized in determining whether a portion of a transcription references a modification and/or a selection of a related option, and can provide corresponding indication(s) to the resolution engine 146 for use by resolution engine 146 in making such determination(s). For example, assume a related option of "make it a combo" is being rendered in the GUI along with an annotation, for the related option, of "A". If the user speaks "A", the display-dependent parser 144 can determine this relates to the related option, provide an indication of such to the resolution engine 146, and the resolution engine 146 can add the "combo" item(s) to the list (e.g., "fries and a drink"). If the user speaks "combo it", the semantic parser 142 can determine this matches the intent of "make it a combo", provide an indication of such to the resolution engine 146, which can determine that is an active intent due to it being for a related option, and the resolution engine 146 can add the "combo" item(s) to the list.

The GUI engine 148 can interface with the application 118 and cause a GUI rendered by the application 118 to be dynamically updated throughout an interaction with a user, and in dependence on output(s) from semantic parser 142, display-dependent parser 144, and/or resolution engine 148. In some implementations, the application 118 can be a browser and/or the GUI engine 148 can render the GUI via webpage(s), such as via script(s) in an HTML document.

The state management engine 149 can maintain a list for an ongoing interaction and can receive, from resolution engine 146, item(s) to add and/or item(s) to remove from list for the ongoing interaction. Further, once an ongoing interaction is complete, the state management engine 149 can interact with a fulfillment system 150, in causing one or more action(s) to be performed based on the final state of the list. For example, the state management engine 149 can transmit, to the fulfillment system 150 via an API, structured representation(s) and/or other identifier(s) of item(s) of the list. In response, the fulfillment system 150 can, for example, cause the item(s) to be queued for preparation, queued delivery, and/or can perform other action(s). In some implementations, the state management engine 149 can be omitted from the interactive GUI system 140 and may instead be combined with the fulfillment system 150. In some of those implementations, the resolution engine 146 can interact with the fulfillment system 150 (e.g., via an API) in adding and/or removing item(s) from a list for an ongoing interaction.

Although FIG. 1 is described with respect to a single client device 110, it should be understood that is for the sake of example and is not meant to be limiting. For example, a given entity can utilize multiple client devices. For instance, a given QSR location can include two or more client devices that each interact with the interactive GUI system. As another example, multiple disparate entities can each have respective client device(s) and can each interact with the interactive GUI system 140 (or another instance thereof). Different entities, however, will be associated with different items—and those can be stored in items database 155 and be provided by the entities.

Figure 2:
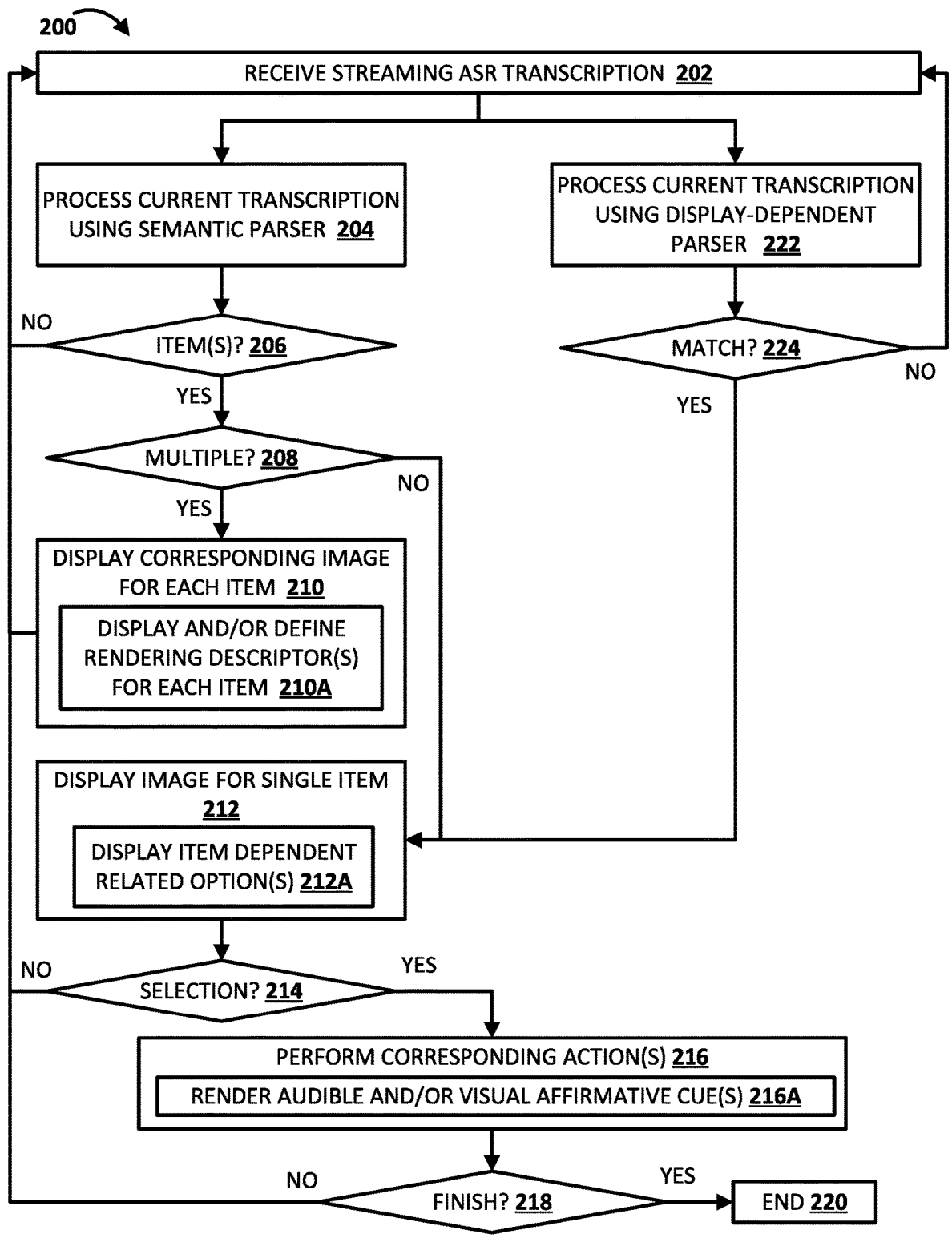
FIG. 2 illustrates an example method in accordance with various implementations.

Turning now to FIG. 2, a flowchart of an example method 200 of some implementations disclosed herein is illustrated. For convenience, the operations of the method 200 are described with reference to a system that performs the operations. The system includes one or more processors, memory, and/or other component(s) of computing device(s) (e.g., interactive GUI system 140, computing device 410 of FIG. 4, one or more servers, and/or other computing devices). Moreover, while operations of the method 200 are shown in a particular order, this is not meant to be limiting. One or more operations may be reordered, omitted, and/or added.

At block 202, the system receives a streaming ASR transcription. The streaming ASR transcription can be generated by an ASR engine based on processing, using a streaming ASR model, a stream of audio data from microphone(s) associated with a display device. The stream of audio data can capture one or more spoken utterances of a user.

At block 204, the system processes the current transcription (i.e., the thus far received transcription of the streaming ASR transcription) using a semantic parser.

At block 206, the system determines, based on the semantic parsing of block 204, whether there are any matching item(s). For example, the system can determine whether the semantic parsing of block 204 indicates any item(s) from a superset of items corresponding to the streaming ASR transcription. For instance, the system can determine there are matching item(s) if the semantic parsing generates structured representation(s), each for a corresponding item, that have corresponding confidence score(s) that satisfy a threshold. If, at block 206 the system determines there are not any matching items, the system proceeds back to block 202 and receives a further portion of the streaming ASR transcription. If, at block 206 the system determines there are matching item(s), the system proceeds to block 208.

At block 208, the system determines, based on the semantic parsing of block 204, whether there are multiple matching items or, rather, only a single matching item. For example, the system can make this determination based on whether the semantic parsing has generated multiple structured representations and/or based on the confidence score(s) for the multiple structured representations. If, at block 208 the system determines there is only a single item, the system proceeds to block 212. If, at block 208 the system determines there are multiple matching item(s), the system proceeds to block 210.

At block 210, the system displays a corresponding image for each of the multiple items, and displays the corresponding images simultaneously. For example, the system can cause an application GUI to render the corresponding images of the multiple items. The system can optionally display additional information, for each of the multiple items, such as a visual natural language descriptor of the item, a visual price of the item, and/or other additional information.

Block 210 optionally includes optional sub-block 210A, in which the system displays and/or defines corresponding rendering descriptor(s) for each item. For example, the system can display an annotation descriptor of "A" next to a first image for a first item, an annotation descriptor of "B" next to a second image for a second item, etc.—and define corresponding associations between those annotation descriptors and the corresponding items. Also, for example, the system can define a corresponding positional descriptor for each of the items. Each positional descriptor can describe a relative position, in the display, of the corresponding image (and optional additional information) for the item.

After block 210, the system proceeds back to block 202 and receives a further portion of the streaming ASR transcription.

During at least some iterations of blocks 204, 206, 208, 210, and/or 212, the system can, in parallel, perform block 222. For example, the system can perform block 222 at least when rendering descriptor(s) are defined for a current display (e.g., via an iteration of sub-block 210A). At block 222, the system processes the current transcription using a display-dependent parser. The display-dependent parser can leverage current rendering descriptor(s) in determining whether a current portion of the streaming transcription matches one of the rendering descriptor(s).

At block 224, the system determines whether the display-dependent parser indicates the current portion of the streaming transcription matches one of the rendering descriptor(s). If not, the system proceeds back to block 202. If so, the system proceeds to block 212.

At block 212, the system displays an image for a single item and, optionally, additional information for the single item. The system can optionally render, along with the image for the single item, an impending selection indication (e.g., highlighting around the image). When block 212 is encountered from a "yes" determination at block 224, the system displays the single item based on the determination, at block 224, indicating that the current portion of the streaming transcription matches one of the rendering descriptor(s) that is associated with the single item. When block 212 is encountered from a "no" determination at block 208, the system displays the single item based on the determination, at block 208, indicating there is only a single matching item. Block 212 optionally includes sub-block 212A, in which the system displays one or more item-dependent related options (e.g., other related item(s) to add to a list along with the selected item).

At block 214, the system determines whether there is a selection of the single item of block 212 and, optionally, whether there is also a selection of one of the item-dependent related option(s) optionally displayed at sub-block 212A. For example, the system can determine a passive selection of the single item in response to passage of a threshold amount of time without receiving any further spoken input from the user. As another example, the system can determine an active selection of the single item in response to further affirmative spoken input from the user (e.g., as determined in another iteration of block 204—not illustrated for sake of simplicity). As yet another example, the system can determine there is also a selection of one of the item-dependent related option(s) in response to further affirmative spoken input from the user that semantically references the related option or references a rendering descriptor of the related option (e.g., as determined in another iteration of block 204 and/or another iteration of block 222—not illustrated for sake of simplicity).

If the decision at block 214 is no (e.g., responsive to receiving further negative spoken input), the system proceeds back to block 202, optionally also rendering an audible and/or visual negative cue such as a negative earcon and/or an "X" or other "cancellation" symbol. If the decision at block 214 is yes, the system proceeds to block 216 and performs one or more corresponding action(s), such as interfacing with a state management engine and/or a fulfillment system in adding the item to a list. Block 216 optionally includes block 216A in which the system renders audible and/or visual affirmative cue(s) to indicate the adding of the item to the list, such as a positive earcon and/or a "checkmark" or other "affirmative" symbol.

At block 218, the system determines whether the current interaction with the user is complete. This can be based on, for example, performing another iteration of block 204 and/or another iteration of block 222 (not illustrated for sake of simplicity) to determine whether the user has provide further spoken input and, if so, whether it indicates that the interaction is complete or, instead, that the interaction should continue. If the decision at block 218 is "yes", the system proceeds back to block 202. If the decision at block 220 is "no", the system proceeds to block 220 and the iteration of method 200 ends.

Figure 3:
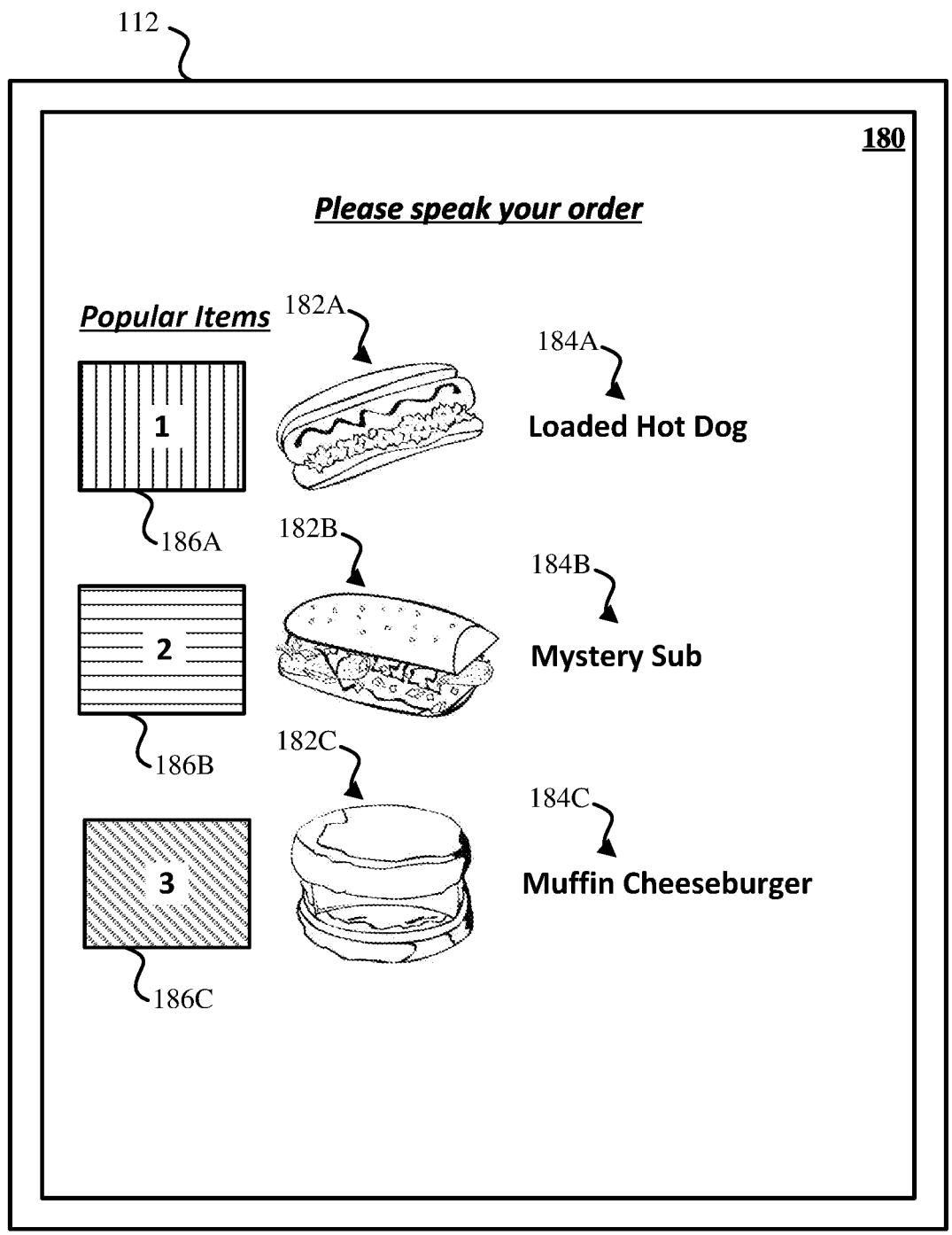
FIG. 3 illustrates a display rendering an example initial state of a GUI for guiding a user in selecting a subset of item(s) from a superset of candidate items.

FIG. 3 illustrates the display 112, of FIG. 1, rendering an example initial state 180 of a GUI for guiding a user in selecting a subset of item(s) from a superset of candidate items. In the example of FIG. 3, and 3A1, 3A2, 3B1, and 3B2, the superset of candidate items are menu items for a QSR. However, it is understood that techniques disclosed herein can additionally or alternatively be utilized with other types of items.

The initial state 180 can be one that is displayed initially e.g., after completion of a prior order and/or when a new vehicle is detected within proximity of the display 112. The initial state e 180 includes first visual outputs for a first item, second visual outputs for a second item, and third visual outputs for a third item. The three items are a subset of the menu items and can be selected for display, on the initial screen, based on various criteria. For example, one or more of the items can be selected based on being popular, being part of a current promotion, or the selection of one or more of the items can be random.

The first visual outputs for the first item include an image 182A, a natural language descriptor 184A, and an annotation 186A. The annotation 186A includes the number "1" and includes "yellow" coloring around "1", where "yellow" is indicated by the vertical hatching. The image 182A and the descriptor 184A can be provided by the QSR and retrieved from a corresponding database. The annotation 186A can be automatically generated e.g., by GUI engine 148, based on a template or otherwise. Further, the GUI engine 148 can associate rendering descriptors with the first item such as annotation descriptors of "1", "yellow", and position descriptor(s) such as "top" and "first".

The second visual outputs for the second item include an image 182B, a natural language descriptor 184B, and an annotation 186B. The annotation 186B includes the number "2" and includes "blue" coloring around "2", where "blue" is indicated by the horizontal hatching. The image 182B and the descriptor 184B can be provided by the QSR and retrieved from a corresponding database. The annotation 186B can be automatically generated e.g., by GUI engine 148, based on a template or otherwise. Further, the GUI engine 148 can associate rendering descriptors with the second item such as annotation descriptors of "2", "blue", and position descriptor(s) such as "middle" and "second".

The third visual outputs for the third item include an image 182C, a natural language descriptor 184C, and an annotation 186C. The annotation 186C includes the number "3" and includes "green" coloring around "3", where "green" is indicated by the diagonal hatching. The image 182C and the descriptor 184C can be provided by the QSR and retrieved from a corresponding database. The annotation 186C can be automatically generated e.g., by GUI engine 148, based on a template or otherwise. Further, the GUI engine 148 can associate rendering descriptors with the third item such as annotation descriptors of "3", "green", and position descriptor(s) such as "bottom" and "third".

Turning initially to FIGS. 3A1 and 3A2, one possible progression from the initial graphical interface of FIG. 3 is illustrated.

FIG. 3A1 illustrates the display 112 rendering an example next state 180A1 of the GUI, following the initial state 180 of FIG. 3, and illustrates example spoken utterances of a user 190A1A, 190A1B, 190A1C, and 190A1D— any one of which, when provided while the state 180 of FIG. 3 was displayed, could cause the example next state 180A1 to be rendered. In FIG. 3A1, the second item ("mystery sub") has been selected as a particular item, and a visual output 182B1 of an image of the "mystery sub" is illustrated in the next state 180A1 of FIG. 3A1, with a box around the image to indicate that addition of the "mystery sub" to a list is imminent.

When the spoken utterance 190A1A ("two"), 190A1B ("blue"), or 190A1C ("middle one") are provided while the state 180 of FIG. 3 was displayed, selection of the "mystery sub" (and transition to next state 180A1) can be based on output from display-dependent parser 144 in processing a corresponding transcription. For example, because the rendering descriptors of "2", "blue", and "middle" are associated with the second item whilestate 180 is displayed, any one of the spoken utterances 190A1A, 190A1B, and 190A1C ("middle one") would result in the display-dependent parser 144 determining, based on a corresponding transcription, to select the "mystery sub".

Notably, the semantic parser 142 would not resolve any of spoken utterances 190A1A, 190A1B, and 190A1C to the "mystery sub" as they are not semantically descriptive of the actual "mystery sub". However, when the spoken utterance 190A1D ("mystery sub") is provided, selection of the "mystery sub" (and transition to next graphical interface 180A1) can be based on output from the semantic parser 144 in processing a corresponding transcription.

FIG. 3A1 also illustrates visual outputs for a first related option, for the "mystery sub", of also adding drinks and fries to the list. The visual outputs for the first related option include an image 182D, a natural language descriptor 184D, and an annotation 186D. The annotation 186D includes the number "1" and includes "yellow" coloring around "1". The image 182D and the descriptor 184D can be provided by the QSR and retrieved from a corresponding database. The annotation 186D can be automatically generated e.g., by GUI engine 148, based on a template or otherwise. Further, the GUI engine 148 can associate rendering descriptors with the first related option such as annotation descriptors of "1" and "yellow". Yet further, the display-dependent parser 144 can utilize such rendering descriptors, while graphical interface 180A1 is rendered, in determining whether spoken input references any of those rendering descriptor(s)—and can cause adding, of the items of the first related option, to the list if so.

The visual outputs for the second related option include an image 182E, a natural language descriptor 184E, and an annotation 186E. The annotation 186E includes the number "2" and includes "blue" coloring around "1". The image 182E and the descriptor 184E can be provided by the QSR and retrieved from a corresponding database. The annotation 186E can be automatically generated e.g., by GUI engine 148, based on a template or otherwise. Further, the GUI engine 148 can associate rendering descriptors with the second related option such as annotation descriptors of "2" and "blue". Yet further, the display-dependent parser 144 can utilize such rendering descriptors, while graphical interface 180A1 is rendered, in determining whether spoken input references any of those rendering descriptor(s).

FIG. 3A2 illustrates the display rendering an example further next state 180A2, following the next state 180A1 of FIG. 3A1, and illustrates example spoken utterances of a user 190A2A, 190A2B, and 190A2C— any one of which, when provided while the next state 180A1 of FIG. 3A1 was displayed, can cause the example further next state 180A2 to be rendered. The further next state 180A2 includes the same visual output 182B1 of FIG. 3A1 and also includes a natural language indication 182B1A that the "mystery sub" has been added to the order. Further, an audible affirmative ding 189A2 can be rendered to signify the addition of the "mystery sub" to the order.

The spoken utterance 190A2A is actually representative of lack of any further spoken input from the user. Such lack of any further spoken input, for a threshold duration of time, can be a passive confirmation that causes the "mystery sub" to be added to the order (e.g., by resolution engine 146). Spoken utterances 190A2B ("done") and 190A2C ("sub only") are examples of affirmative confirmations that cause the "mystery sub" to be added to the order. They can be considered affirmative confirmations based on output, from semantic parser 142, in processing a corresponding transcription.

Turning now to FIGS. 3B1 and 362, an alternate possible progression from the initial state 180 of FIG. 3 is illustrated. As will be understood, e.g., with reference to the description of FIGS. 3B1 and 3B2, the alternate possible progression can be based on the user providing an alternate spoken utterance.

FIG. 3B1 illustrates the display rendering an example alternate next state 180B2 of the GUI, following the initial state of FIG. 3, and illustrates example spoken utterances of a user 190B1A and 190B1B— either one of which, when provided while the graphical interface 180 of FIG. 3 was displayed, could cause the example next state 180B1 to be rendered.

FIG. 3B1 includes fourth visual outputs for a fourth item, fifth visual outputs for a fifth item, and sixth visual outputs for a sixth item. The fourth, fifth, and sixth items are selected for display, in alternate next state 180B1 of FIG. 3B1, based on being selected, based on output from semantic parser 142 in processing a transcription from spoken utterance 190B1A or spoken utterance 190B1B.

The fourth visual outputs for the fourth item include an image 182F, a natural language descriptor 184F, and an annotation 186F. The annotation 186F includes the number "1" and includes "yellow" coloring around "1". The image 182F and the descriptor 184F can be provided by the QSR and retrieved from a corresponding database. The annotation 186F can be automatically generated e.g., by GUI engine 148, based on a template or otherwise. Further, the GUI engine 148 can associate rendering descriptors with the fourth item such as annotation descriptors of "1", "yellow", and position descriptor(s) such as "top" and "first".

The fifth visual outputs for the fifth item include an image 182G, a natural language descriptor 184G, and an annotation 186G. The annotation 186G includes the number "2" and includes "blue" coloring around "2". The image 182G and the descriptor 184G can be provided by the QSR and retrieved from a corresponding database. The annotation 186G can be automatically generated e.g., by GUI engine 148, based on a template or otherwise. Further, the GUI engine 148 can associate rendering descriptors with the fifth item such as annotation descriptors of "2", "blue", and position descriptor(s) such as "middle" and "second".

The sixth visual outputs for the sixth item include an image 182H, a natural language descriptor 184H, and an annotation 186H. The annotation 186H includes the number "3" and includes "green" coloring around "3". The image 182H and the descriptor 184H can be provided by the QSR and retrieved from a corresponding database. The annotation 186H can be automatically generated e.g., by GUI engine 148, based on a template or otherwise. Further, the GUI engine 148 can associate rendering descriptors with the sixth item such as annotation descriptors of "3", "green", and position descriptor(s) such as "bottom" and "third".

FIG. 3B2 illustrates the display 112 rendering an example further next alternate state 180B2 of the GUI, following the alternate next state 180B1 of FIG. 3B1, and illustrates example spoken utterances of a user 190B2A, 190B2B, 190B2C— any one of which, when provided while the next state 180B1 of FIG. 3B1 was displayed, can cause the example further alternate next state 180B1 to be rendered.

In FIG. 3B2, the fourth item ("eggs and bacon platter") has been selected as a particular item, and a visual output 182F1 of an image of the "eggs and bacon platter" is illustrated in the further next graphical interface 180B2 of FIG. 3B2, with a box around the image to indicate that the "eggs and bacon platter" has been added to the order. FIG. 3B2 also includes a natural language indication 182F1A that the "eggs and bacon platter" has been added to the order. Further, an audible affirmative ding 189B2 can be rendered (via speaker(s) 116) to signify the addition of the "eggs and bacon platter" to the order. No related options are illustrated in FIG. 3B2 for the "eggs and bacon platter," based on none being defined for the "eggs and bacon platter".

When the spoken utterance 190B2A ("one") or 190B2B ("yellow") are provided while the alternate next state 180B1 of FIG. 3B1 was displayed, selection of the "eggs and bacon platter" (and transition to alternate further next state 180B2) can be based on output from display-dependent parser 144 in processing a corresponding transcription. For example, because the rendering descriptors of "1" and "yellow" are associated with the fourth item while the alternate next state 180B1 is displayed, either of the spoken utterances 190B2 and 190B2B would result in the display-dependent parser 144 determining, based on a corresponding transcription, to select the "eggs and bacon platter".

Notably, the semantic parser 142 would not resolve either of spoken utterances 190B2A and 190B2B to the "eggs and bacon platter" as they are not semantically descriptive of the actual "eggs and bacon platter". However, when the spoken utterance 190B2C ("plate") is provided, selection of the "eggs and bacon platter" (and transition to further alternate next state 180B2) can be based on output from the semantic parser 144 in processing a corresponding transcription. Although spoken utterances 190B2A, 190B2B, and 190B2C are illustrated in FIG. 3B2, in some implementations transition to the further alternate next state 180B2 can additionally or alternatively be based on e.g., detecting a user is pointing at and/or directing their gaze toward an area of the alternate next state 180B1, and semantic parser 142 determining that area is associated with a positional descriptor for the "eggs & bacon platter".

As noted above, alternate further next state 180B2 includes the visual output 182F1 of the image of the "eggs & bacon platter", with a box around the image to indicate that the "eggs and bacon platter" has been added to the order— and is illustrated without any visual output corresponding to the "bacon cheeseburger" or the "crab cake & bacon w/ bun" of the alternate next state 180B1 of FIG. 3B1. However, a further alternate further next state could instead match the alternate next state 180B1 of FIG. 3B1, but include visual indication(s) to indicate selection of the "eggs & bacon platter". Put another way, a further alternate further next state may not exclusively contain visual output corresponding to the "eggs & bacon platter"-but can also include visual output corresponding to the "bacon cheeseburger" and "crab cake & bacon w. bun" (even though those are not selected). For example, the visual indication(s) that indicates the selection could include a box or circle around the image 182F, the natural language descriptor 184F, and/or the annotation 186F. Also, for example, the visual indication(s) that indicates the selection could additionally or alternatively include an "X" or strikethrough rendered atop the visual outputs for the "bacon cheeseburger" and the "crab cake & bacon w/ bun". An audible earcon that indicates the selection could also be rendered in such a further alternate further next state.

Figure 4:
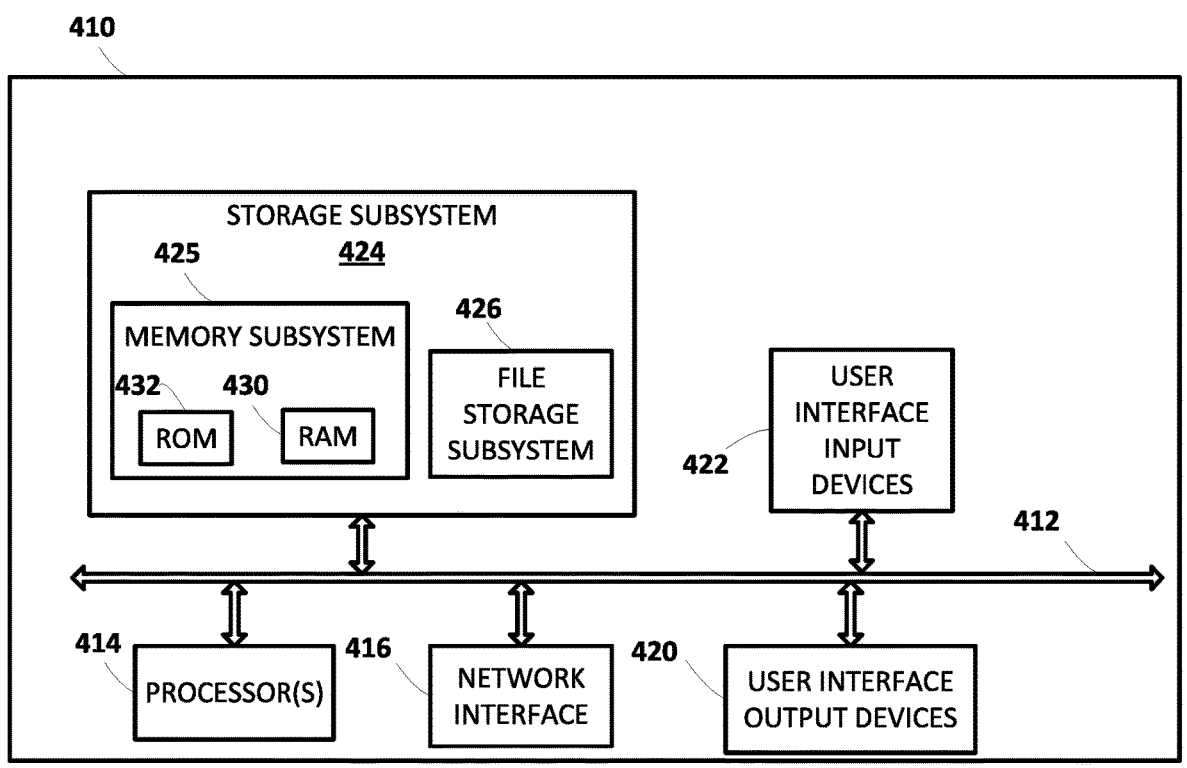
FIG. 4 depicts an example architecture of a computing device, in accordance with various implementations.

Turning now to FIG. 4, a block diagram of an example computing device 410 that may optionally be utilized to perform one or more aspects of techniques described herein is depicted. In some implementations, one or more of a client device, cloud-based automated assistant component(s), and/or other component(s) may comprise one or more components of the example computing device 410.

Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touch screen incorporated into the display, audio input devices such as voice recognition systems, microphones, cameras for gesture detection, detection of pointing at an item, or detection of visual focus, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods disclosed herein, as well as to implement various components depicted in the figures.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, solid state disk drive or other storage chip, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem 412 may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by processor(s) is provided, and includes, as a spoken utterance is being provided by a user and being captured, via one or more microphones, in an audio data stream: receiving a portion, of a streaming transcription of the spoken utterance, that is generated using streaming automatic speech recognition; and processing the portion, using a semantic parser, to determine, from a defined superset of items, a subset that includes multiple of the items of the superset. The method further includes, as the spoken utterance is being provided and being captured, and responsive to determining the subset: selecting a corresponding image for each of the items of the subset; causing the corresponding images to be rendered simultaneously, on a display that is visible to the user, and to be rendered without simultaneous rendering of any images for any other of the items, of the superset, that are not included in the subset; and defining, for each of the items of the subset, a corresponding association of the item to one or more corresponding rendering descriptors for the item. The method further includes, as the spoken utterance is being provided and being captured and during simultaneous rendering of the corresponding images: receiving an additional portion of the streaming transcription of the spoken utterance, the additional portion being based on a part of the spoken utterance that is provided during simultaneous rendering of the corresponding images; processing the additional portion using the semantic parser and processing the additional portion using a display-dependent parser; determining, based on processing the additional portion of the transcription, a particular item of the items of the subset; and performing a further action, that is specific to the particular item, responsive to determining the particular item based on processing the additional portion of the transcription. Processing the additional portion using the display-dependent parser can include utilizing the corresponding rendering descriptors responsive to the additional portion being based on the part of the spoken utterance that is provided during simultaneous rendering of the corresponding images.

These and other implementations of the technology disclosed herein can include one or more of the following features.

In some implementations, no synthesized speech is provided as output during providing of the spoken utterance.

In some implementations, determining, based on processing the additional portion of the transcription, the particular item of the subset includes determining the particular item based on the particular item being unambiguously indicated by one of (a) processing the additional portion using the semantic parser and (b) processing the additional portion using the display-dependent parser. In some versions of those implementations, processing the additional portion using the display-dependent parser includes determining whether the additional portion matches any of the corresponding rendering descriptors. In some of those versions, determining, based on processing the additional portion of the transcription, the particular item of the items of the subset includes: selecting a particular item, of the items of the subset, responsive to determining that the additional transcription portion matches a given rendering descriptor of the corresponding rendering descriptors and that the corresponding association, for the particular item, is to the given rendering descriptor. The given rendering descriptor can be, for example, a positional descriptor or an annotation descriptor, such as a positional descriptor that describes a relative position, of the corresponding image for the particular item, on the display, or an annotation descriptor that describes an annotation rendered in conjunction with the corresponding image, for the particular item, on the display. For example, the given rendering descriptor can be the annotation descriptor and the annotation descriptor can be a number, a letter, a code, or a color.

In some implementations, processing the additional portion using the semantic parser includes generating, using the semantic parser and based on the portion and the additional portion, a structured representation that corresponds to the particular item and a confidence measure for the structured representation. In some of those implementations, determining, based on processing the additional portion of the transcription, the particular item of the subset includes determining the particular item based on the particular item corresponding to the structured representation and based on the confidence measure, for the structured representation, satisfying a threshold.

In some implementations, performing the further action includes causing the corresponding image, for the particular item, to be rendered on the display without simultaneous rendering of any other of the corresponding images for any other of the items of subset. In some versions of those implementations, the method further includes determining an acceptance of the particular item after performing the further action and, in response to determining the acceptance, interfacing with a fulfillment application programming interface (API) to add the particular item to a list maintained via the fulfillment API. In some of those versions, determining the acceptance is based on no further spoken input being received within a threshold period of time after causing the corresponding image, for the particular item, to be rendered on the display without simultaneous rendering of any other of the corresponding images for any other of the items of subset. In some additional or alternative of those versions, the method further includes, in response to determining the acceptance, causing an audible affirmative earcon to be rendered via one or more speakers on the display or in proximity to the display.

In some implementations, performing the further action includes interfacing with a fulfillment application programming interface (API) to add the particular item to a list maintained via the fulfillment API.

In some implementations, the one or more processors are of one or more remote servers that are in network communication with the display.

In some implementations, a method implemented by processor(s) is provided and includes, as a spoken utterance is being provided by a user and being captured, via one or more microphones, in an audio data stream: processing a portion of the audio data stream, using a streaming automatic speech recognition (ASR) model, to generate a transcription portion of a streaming transcription of the spoken utterance; processing the transcription portion to determine, from a defined superset of items, a subset that includes multiple of the items of the superset; and responsive to determining the subset: selecting a corresponding image for each of the items of the subset; causing the corresponding images to be rendered simultaneously, on a display that is visible to the user, and to be rendered without simultaneous rendering of any images for any other of the items, of the superset, that are not included in the subset; and defining, for each of the items of the subset, a corresponding association of one or more corresponding rendering descriptors for the item. The method further includes, during simultaneous rendering of the corresponding images: processing an additional portion of the audio data stream, using the streaming ASR model, to generate an additional transcription portion of the streaming transcription of the spoken utterance, the additional portion of the audio data stream including audio data captured during simultaneous rendering of the corresponding images; determining that the additional transcription portion matches a given rendering descriptor, of the rendering descriptors; selecting a particular item, of the items of the subset, responsive to determining that the additional transcription portion matches the given rendering descriptor; and performing a further action, that is specific to the particular item, responsive to selecting the particular item.

These and other implementations of the technology disclosed herein can include one or more of the following features.

In some implementations, processing the transcription portion to determine the subset includes determining at least a threshold degree of matching between the first transcription portion and each of the items of the subset In some implementations, the one or more corresponding rendering descriptors each describe a corresponding position of rendering a corresponding one of the items.

In some implementations, the one or more corresponding rendering descriptors each describe a corresponding annotation applied to the rendering of the corresponding image of a corresponding one of the items.

In some implementations, processing the transcription portion to determine, from the defined superset of items, the subset includes generating, using a semantic parser and based on the portion: multiple structured representations that each corresponds to a corresponding one of the items of the subset, and a corresponding confidence measure for each of the structured representations; and determining the subset based on the corresponding confidence measures, for the structured representations of the items of the subset, satisfying a threshold.

In some implementations, causing the corresponding images to be rendered simultaneously, on the display, includes causing the corresponding images to be rendered in an arrangement that is determined based on the corresponding confidence measures for each of the structured representations. In some of those implementations, causing the corresponding images to be rendered simultaneously, on the display, includes causing the corresponding images to be rendered in an arrangement that is determined based on: the corresponding confidence measures for each of the structured representations, and corresponding measures of popularity for the items of the subset.

In some implementations, no synthesized speech is provided as output during providing of the spoken utterance.

In some implementations, performing the further action includes causing the corresponding image, for the particular item, to be rendered on the display without simultaneous rendering of any other of the corresponding images for any other of the items of subset. In some versions of those implementations, the method further includes determining an acceptance of the particular item after performing the further action and in response to determining the acceptance, interfacing with a fulfillment application programming interface (API) to add the particular item to a list maintained via the fulfillment API. In some of those versions, determining the acceptance is based on no further spoken input being received within a threshold period of time after causing the corresponding image, for the particular item, to be rendered on the display without simultaneous rendering of any other of the corresponding images for any other of the items of subset. In some additional or alternative of those versions the method further includes, in response to determining the acceptance, causing an audible affirmative earcon to be rendered via one or more speakers on the display or in proximity to the display.

In some implementations, performing the further action comprises interfacing with a fulfillment application programming interface (API) to add the particular item to a list maintained via the fulfillment API.

In some implementations, the one or more processors are of one or more remote servers that are in network communication with the display.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
   as a spoken utterance is being provided by a user and being captured, via one or more microphones, in an audio data stream:
   receiving a portion, of a streaming transcription of the spoken utterance, that is generated using streaming automatic speech recognition;
   processing the portion, of the streaming transcription of the spoken utterance, using a semantic parser, to determine, from a defined superset of items, a subset that includes multiple of the items of the superset;
   wherein the superset of items is a finite set of candidate items that are limited by available menu items, responsive to determining the subset:
   selecting a corresponding image for each of the items of the subset;
   causing the corresponding images to be rendered simultaneously, on a display that is visible to the user, and to be rendered without simultaneous rendering of any images for any other of the items, of the superset, that are not included in the subset;
   defining, for each of the items of the subset, a corresponding association of the item to multiple corresponding rendering descriptors for the item,
   wherein the corresponding rendering descriptors include annotation descriptors that are not semantically descriptive of the item and that describe annotations that are rendered in conjunction with the corresponding image, for the item; and
   defining, for each of the items of the subset, a corresponding association of the item to one or more corresponding natural language descriptors for the item,
   wherein one or more of the corresponding natural language descriptors describes the item;
   during simultaneous rendering of the corresponding images:
   receiving an additional portion of the streaming transcription of the spoken utterance, the additional portion being based on a part of the spoken utterance that is provided during simultaneous rendering of the corresponding images;
   processing the additional portion using the semantic parser and processing the additional portion using a display-dependent parser,
   wherein processing the additional portion using the semantic parser comprises utilizing the one or more corresponding natural language descriptors responsive to the additional portion being based on the part of the spoken utterance that is provided during simultaneous rendering of the corresponding images; and
   wherein processing the additional portion using the display-dependent parser comprises utilizing the corresponding rendering descriptors, including the annotation descriptors, responsive to the additional portion being based on the part of the spoken utterance that is provided during simultaneous rendering of the corresponding images in conjunction with the annotations;
   determining, based on processing the additional portion of the transcription, a particular item of the items of the subset; and
   performing a further action, that is specific to the particular item, responsive to determining the particular item based on processing the additional portion of the transcription.

2. The method of claim 1, wherein no synthesized speech is provided as output during providing of the spoken utterance.

3. The method of claim 1, wherein determining, based on processing the additional portion of the transcription, the particular item of the subset comprises:
   determining the particular item based on the particular item being unambiguously indicated by one of (a) processing the additional portion using the semantic parser and (b) processing the additional portion using the display-dependent parser.

4. The method of claim 3, wherein processing the additional portion using the display-dependent parser comprises:
   determining whether the additional portion matches any of the corresponding rendering descriptors.

5. The method of claim 4, wherein determining, based on processing the additional portion of the transcription, the particular item of the items of the subset comprises:
   selecting a particular item, of the items of the subset, responsive to determining that the additional transcription portion matches a given rendering descriptor of the corresponding rendering descriptors and that the corresponding association, for the particular item, is to the given rendering descriptor.

6. The method of claim 5, wherein the given rendering descriptor is a positional descriptor that describes a relative position, of the corresponding image for the particular item, on the display.

7. The method of claim 1, wherein the annotation descriptors include two or more of a number, a letter, a code, or a color.

8. The method of claim 1, wherein processing the additional portion using the semantic parser comprises:
generating, using the semantic parser and based on the portion and the additional portion, a structured representation that corresponds to the particular item and a confidence measure for the structured representation.

9. The method of claim 8, wherein determining, based on processing the additional portion of the transcription, the particular item of the subset comprises:
determining the particular item based on the particular item corresponding to the structured representation and based on the confidence measure, for the structured representation, satisfying a threshold.

10. The method of claim 1, wherein performing the further action comprises:
causing the corresponding image, for the particular item, to be rendered on the display without simultaneous rendering of any other of the corresponding images for any other of the items of the subset.

11. The method of claim 10, further comprising:
determining an acceptance of the particular item after performing the further action; and
in response to determining the acceptance, interfacing with a fulfillment application programming interface (API) to add the particular item to a list maintained via the fulfillment API.

12. The method of claim 11, wherein determining the acceptance is based on no further spoken input being received within a threshold period of time after causing the corresponding image, for the particular item, to be rendered on the display without simultaneous rendering of any other of the corresponding images for any other of the items of the subset.

13. The method of claim 11, further comprising, in response to determining the acceptance:
causing an audible affirmative earcon to be rendered via one or more speakers on the display or in proximity to the display.

14. The method of claim 1, wherein performing the further action comprises interfacing with a fulfillment application programming interface (API) to add the particular item to a list maintained via the fulfillment API.

15. The method of claim 1, wherein the one or more processors are of one or more remote servers that are in network communication with the display.

16. A method implemented by one or more processors, the method comprising:
as a spoken utterance is being provided by a user and being captured, via one or more microphones, in an audio data stream:
processing a portion of the audio data stream, using a streaming automatic speech recognition (ASR) model, to generate a transcription portion of a streaming transcription of the spoken utterance;
processing the transcription portion of the streaming transcription of the spoken utterance to determine, from a defined superset of items, a subset that includes multiple of the items of the superset;
responsive to determining the subset:
selecting a corresponding image for each of the items of the subset;
causing the corresponding images to be rendered simultaneously, on a display that is visible to the user, and to be rendered without simultaneous rendering of any images for any other of the items, of the superset, that are not included in the subset;
defining, for each of the items of the subset, a corresponding association of the item to one or more corresponding natural language descriptors for the item; and
defining, for each of the items of the subset, a corresponding association of multiple corresponding rendering descriptors for the item, the multiple corresponding rendering descriptors describing multiple disparate annotations rendered in association with the item and being in addition to the one or more corresponding natural language descriptors for the item;
during simultaneous rendering of the corresponding images:
processing an additional portion of the audio data stream, using the streaming ASR model, to generate an additional transcription portion of the streaming transcription of the spoken utterance, the additional portion of the audio data stream including audio data captured during simultaneous rendering of the corresponding images in conjunction with the annotations;
determining, based on processing the additional transcription portion, the one or more natural language descriptors, and the rendering descriptors, including the descriptors describing mulitple disparate annotations, that the additional transcription portion matches a given natural language descriptor of the one or more natural language descriptors or matches a given rendering descriptor, of the rendering descriptors;
selecting a particular item, of the items of the subset, responsive to determining that the additional transcription portion matches the given rendering descriptor; and
performing a further action, that is specific to the particular item, responsive to selecting the particular item.

17. The method of claim 16, wherein processing the transcription portion to determine the subset comprises determining at least a threshold degree of matching between the first transcription portion and each of the items of the subset.

18. The method of claim 16, wherein the multiple corresponding rendering descriptors each describe a corresponding position of rendering a corresponding one of the items.

19. The method of claim 16, wherein the multiple disparate annotations rendered in association with the item, that are described by the multiple corresponding rendering descriptors, include color annotations and numerical annotations.

* * * * *